US008351400B2

(12) United States Patent
Damnjanovic et al.

(10) Patent No.: US 8,351,400 B2
(45) Date of Patent: Jan. 8, 2013

(54) METHOD AND APPARATUS FOR OVERHEAD REDUCTION IN AN ENHANCED UPLINK IN A WIRELESS COMMUNICATION SYSTEM

(75) Inventors: Jelena Damnjanovic, Del Mar, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 875 days.

(21) Appl. No.: 11/118,063

(22) Filed: Apr. 29, 2005

(65) Prior Publication Data

US 2005/0276249 A1 Dec. 15, 2005

Related U.S. Application Data

(60) Provisional application No. 60/568,623, filed on May 5, 2004.

(51) Int. Cl.
*H04B 7/216* (2006.01)
*H04B 7/00* (2006.01)

(52) U.S. Cl. ......... 370/335; 370/310; 370/342; 370/394

(58) Field of Classification Search .................. 370/310, 370/325, 335, 341, 342, 394
See application file for complete search history.

(56) References Cited

U.S. PATENT DOCUMENTS

| 7,013,143 B2* | 3/2006 | Love et al. ................. 455/450 |
| 7,272,113 B2* | 9/2007 | Cheng et al. ................. 370/231 |
| 7,277,439 B2* | 10/2007 | Rosier et al. ................. 370/394 |
| 7,359,345 B2 | 4/2008 | Chang et al. |
| 2002/0015408 A1 | 2/2002 | Rosier et al. ................. 370/392 |
| 2002/0097689 A1 | 7/2002 | Eloy et al. |

FOREIGN PATENT DOCUMENTS

| CN | 1414727 A | 4/2003 |
| EP | 0866579 | 9/1998 |
| EP | 1161023 | 12/2001 |
| EP | 1286491 | 2/2003 |
| EP | 1545040 | 6/2005 |
| JP | 2001516177 A | 9/2001 |
| JP | 2002033720 A | 1/2002 |
| KR | 1020020062815 | 7/2002 |
| WO | WO9909698 A1 | 2/1999 |
| WO | 0008808 | 2/2000 |

OTHER PUBLICATIONS

"Text proposal on HARQ for HSDPA TR" 3GPP TSG RAN WG1, Meeting #17, Nov. 21-24, 2000, Stockholm, Sweden. Retrieved from the Internet: URL: http://www.3gpp.org/ftp/tsg_ran/WG1_RL1/TSGR1_17/Docs/PDFs/R1-00-1369.pdf.
International Search Report—PCT/US05/014713, International Search Authority—European Patent Office, Aug. 10, 2005.

(Continued)

*Primary Examiner* — Ajit Patel
(74) *Attorney, Agent, or Firm* — Rupit M. Patel

(57) ABSTRACT

Systems and methods are provided in a synchronous wireless communication system 100 which enable data to be transmitted between wireless mobile user equipment 110 and base stations 120 without identifying information embedded in the packets 401, thus reducing the transmission overhead. Packets are reordered at base stations 120 based upon a prearranged transmission scheme in which a retransmission for a failed packet is expected in the corresponding HARQ instance of the next group.

21 Claims, 7 Drawing Sheets

OTHER PUBLICATIONS

Written Opinion—PCT/US05/014713, International Search Authority—European Patent Office, Aug. 10, 2005.
International Preliminary Report on Patentability—PCT/US05/014713—IPEA/US, Aug. 3, 2006.
3GPP TSG RAN WG1#36, Comparison of synchronous and asynchronous HARQ, Malaga, Spain, Feb. 16-20, 2004.
Taiwan Search Report—TW094114417—TIPO—Jul. 28, 2011.
Interdigital et al., "Text proposal on Reference Techniques in Earlier Releases and HARQ as Candidate Technique for TDD UL Enhancements", TBD Uplink Enhancements for UTRA TDD, 3GPP RAN1#36 R1-040176, Feb. 2004, <URL: http://www.3gpp.org/ftp/ts_ran/WG1_RL1/TSGR1_36/Docs/Zips/R1-040176.zip>(JP-N6-09-024672).
Motorola: "AH64: Uplink HARQ Schemes and SHO considerations", Enhanced Uplink Dedicated Transport Channel, 3GPP RAN1#30 R1-030068, Jan. 2003 <URL:http://www.3gpp.org/ftp/tsg_ran/WG1_RL1/TSGR1_30/Docs/Zips/R1-030068.zip>(JP-N6-09-024668).

* cited by examiner

METHOD AND APPARATUS FOR OVERHEAD REDUCTION IN AN ENHANCED UPLINK IN A WIRELESS COMMUNICATION SYSTEM

CLAIM OF PRIORITY UNDER 35 U.S.C. §119

This application claims priority under 35 U.S.C. §119(e) to U.S. Provisional Patent Application No. 60/568,623, entitled "Technique for Overhead Reduction in Enhanced Uplink (EUL)," filed on May 5, 2004, and assigned to the assignee hereof and hereby expressly incorporated by reference herein.

BACKGROUND

1. Field of the Invention

The present invention relates generally to communication systems, and, more specifically, to apparatus and methods for transmitting data using less data overhead in a wireless communication system.

2. Background

As wireless communications become increasingly popular, the demand for system resources increases as well. As the third generation mobile communication system (3G) becomes more widely accepted, the demand for many new types of high bandwidth wireless data services is expected to increase dramatically. 3G air interface standards—for example, WCDMA—tend to increase the demand for scarce bandwidth by popularizing a number of bandwidth-intensive wireless services such as the wireless transmission of multimedia, wireless e-mailing, Internet access, video streaming, image transmission, and interactive gaming. At present, wireless systems tend to fill nearly to capacity at peak usage times in populous areas, and the demand for bandwidth is expected to increase. System designers are constantly seeking ways to transmit data more efficiently so as to meet the increasing demand for bandwidth. Ironically, as system usage approaches full capacity, the incidence of wireless calls which are dropped may actually increase due to competing signals being simultaneously transmitted, thus requiring additional wireless resources to retransmit the lost data.

High Speed Downlink Packet Access (HSDPA) is one development of the WCDMA standard that streamlines downlink communications to wireless users. Another aspect of increased wireless demand concerns transmissions from the wireless user to the base station, the uplink. High speed uplink transmissions are being addressed by another WCDMA development, the Enhanced Uplink (EUL). The objective of EUL is to enhance high speed data uplink access. Even though the EUL standard is a step in the right direction, there is still room for improvement in the efficiency of wireless uplink transmissions.

SUMMARY

In one aspect of the invention, a method in a wireless communication system is provided. The method comprises forming data into an identityless packet for transmission, and transmitting the identityless packet. The identityless packet is transmitted in accordance with a prearranged transmission scheme allowing the identityless packet to be identified upon receipt based upon an instance during which the identityless packet was transmitted.

In another aspect of the invention, a wireless communication system is provided. The system includes an encoder configured to encode data into an identityless packet and transmission circuitry configured to send an initial transmission of the identityless packet. The system further includes receiver circuitry configured to receive signals comprising a NACK associated with the initial transmission, and a processor including logic organized to control sending a retransmission of the data in response to receiving the NACK. The retransmission is sent in accordance with a prearranged transmission scheme.

In another aspect of the invention, a mobile station is provided. The mobile station includes means for encoding data into an identityless packet, means for transmitting an initial transmission of the identityless packet, means for receiving signals comprising a NACK associated with the initial transmission, and a processor means for controlling a retransmission of the data in response to receiving the NACK. The retransmission is sent a predetermined number of instances following the initial transmission to allow the retransmission to be associated with the initial transmission.

BRIEF DESCRIPTION OF THE DRAWINGS

The accompanying drawings, which are incorporated in and constitute part of the specification, illustrate various embodiments of the invention, and, together with the general description, serve to explain the principles of the invention.

DETAILED DESCRIPTION

Figure 1:
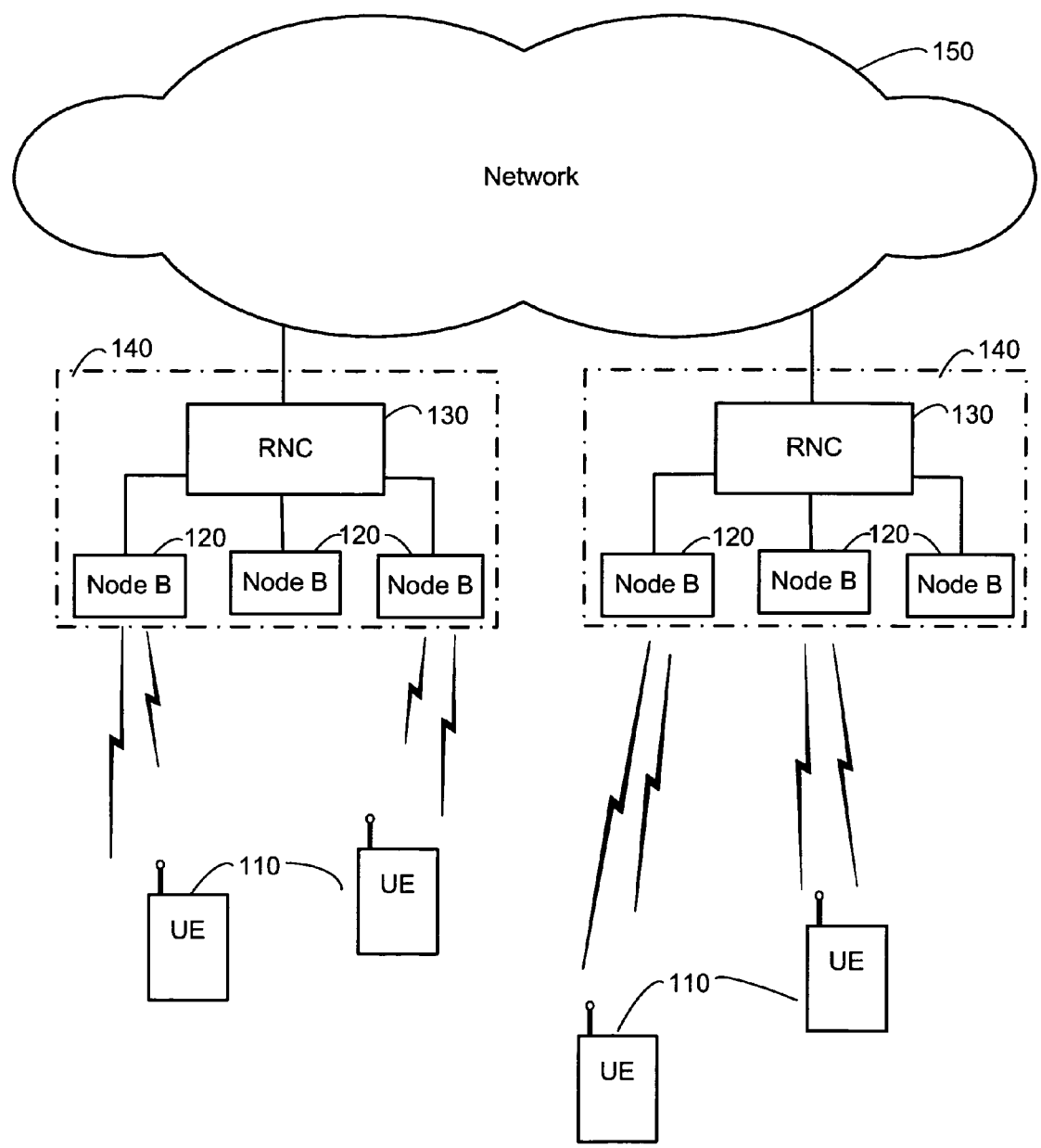
FIG. 1 depicts an exemplary wireless network architecture that may be used to implement various embodiments of the invention.

FIG. 1 depicts a typical wireless network architecture 100 that supports mobile stations and client devices in accordance with various embodiments of the invention. The system depicted is a Wideband Code Division Multiple Access (WCDMA) system, but embodiments of the invention may be implemented to work with CDMA2000, GSM/GPRS, or other such wireless systems and protocols. A wireless system typically includes a core network 150, one or more radio network subsystems (RNS 140), and wireless user equipment 110. The RNS 140, in turn, includes one or more each of a radio network controller (RNC 130) connected to base stations 120 (Node-Bs). Depending upon the particulars of the implementation the Node-B 120 may take other forms, be referred to by other names, or have aspects of other systems in common, for example, base transceiver station (BTS) or base station system (BSS). The radio network controller, labeled as a RNC 130 in the figure, may, in some implementations, may take other forms, be referred to by other names, or have aspects of other systems in common, for example, a base station controllers (BSC), a Mobile Switching Center (MSC) or a Serving GPRS Support Node (SGSN). An SGSN is generally the core network entity dealing with packet-switched connections, and an MSC is the core network entity dealing with circuit-switched connections. FIG. 1 depicts wireless user equipment (UE 110), which may be known by many different names, for example, cellular telephones, mobile stations, wireless handsets, etc. The scope of the invention covers these and other such systems, names, terms and implementations for the elements of like types of wireless systems.

The wireless network depicted in the figure is merely exemplary and may include any system that allows communication over-the-air between and among components, which may be connected in a manner such as the wireless system 100 depicted in FIG. 1. UE 110 may comprise many different types of wireless devices, including one or more cellular telephone, wirelessly connected computer, PDA (personal digital assistant), pager, navigation device, music or video content download unit, wireless gaming device, inventory control unit, or other like types of devices communicating wirelessly via the air interface. Cellular or other wireless telecommunication services may communicate with a carrier network through a data link or other network link via the fixed network 150 which may be the Public Switched Telephone Network (PSTN), the Internet, Integrated Services Digital Network (ISDN), one or more local area networks (LAN) or wide area networks (WAN) or virtual private network (VPN), or other such network.

The wireless system 100 controls messages or other information, typically sent as data packets, via RNS 140 to UE 110. Each RNC 130 is typically connected to one or more Node-B 120 base stations. In the event more than one Node-B 120 is associated with a particular UE 110, all of the Node-Bs 120 in the active set of that UE 110 may have the same notion of the E-DCH frame number, such that packets to or from two different Node-Bs 120 engaged in soft handover (SHO) with the UE 110 can be interpreted and sorted correctly. The RNC 130 may be thought of as acting within the wireless system 100 in a manner akin to a normal switching node of a landline network (e.g., PSTN or ISDN). Typically, the RNC 130 includes the logic (e.g., a processor or computer) to manage and control the wireless UE 110. The logic of the RNC 130 manages and controls functions such as call routing, registration, authentication, location updating, handovers and/or encoding schemes for the wireless UE 110 registered at a Node-B associated with the RNC 130. The RNC 130 is connected to the Node-Bs 120 by a network configured for data transfer and/or voice information, generally via a network of fixed communication lines in a manner similar to the interconnection of network 150.

Communications to and from various RNC 130 and Node-B 120 elements are typically carried out via this network of landlines which may include portions of the Internet and/or the PSTN. Upstream, the RNC 130 may be connected to multiple networks, such as those mentioned above, e.g., PSTN, Internet, ISDN, etc., thus allowing client UE 110 devices access to a broader communication network. In addition to voice transmission data may be transmitted to the client device via SMS or other OTA methods known in the art. The subsystem RNS 140, including the RNC 130, controls the radio links between the Node-Bs 120 and the UE 110. Each Node-B 120 has one or more transmitters and receivers to send and receive information to/from the UE 110.

Node-B 120 broadcasts data messages or other information wirelessly to UE 110 by over-the-air (OTA) methods known to those of ordinary skill in the art. For example, the wireless signals between UE 110 and Node-B 120 may be based on any of several different technologies, including but not limited to, CDMA (code division multiple access), TDMA (time division multiple access), FDMA (frequency division multiplexed access), OFDM (orthogonal frequency division multiplexing) and any systems using a hybrid of coding technologies such as GSM, or other like wireless protocols used in communications or data networks.

Figure 2:
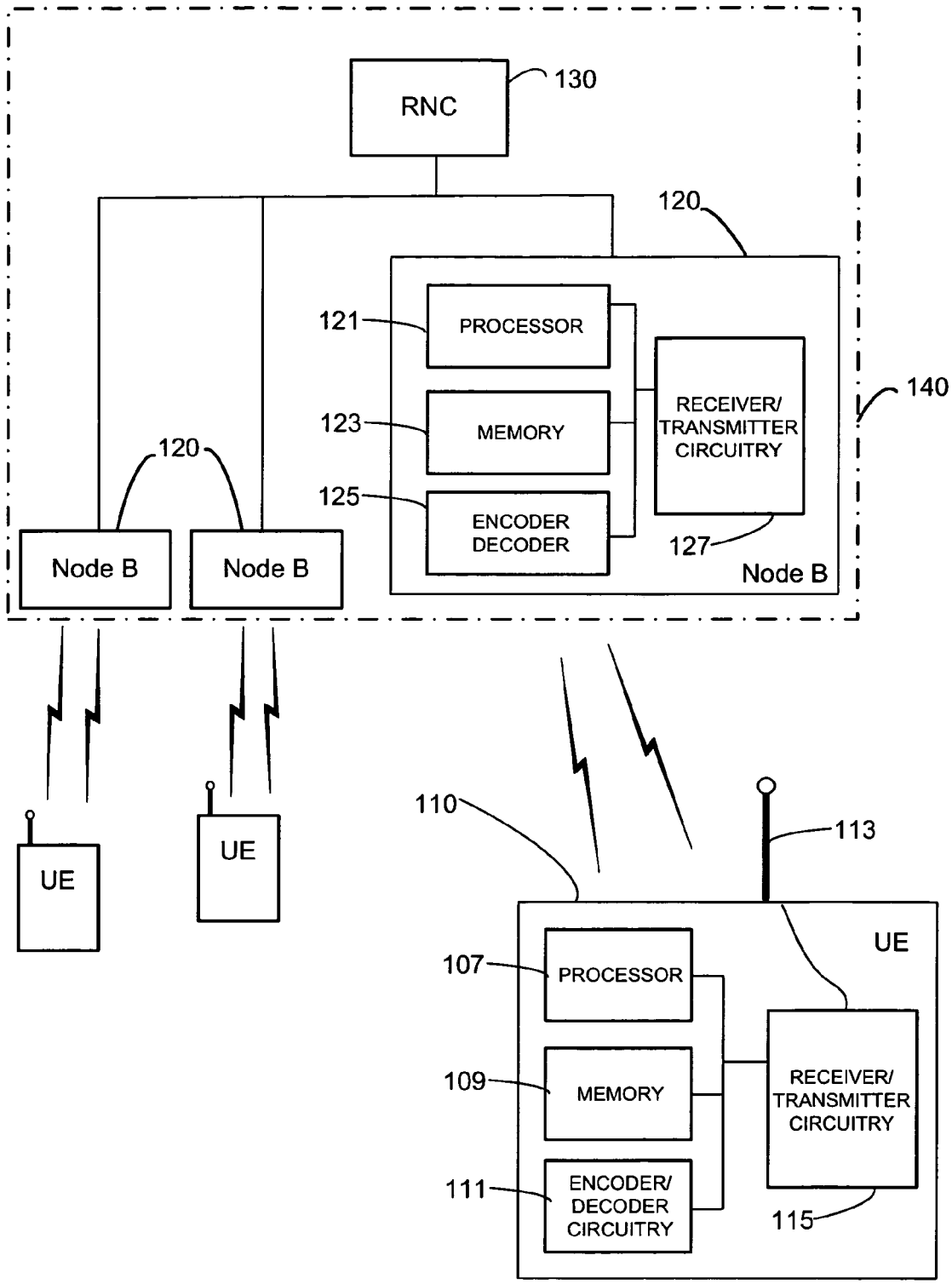
FIG. 2 depicts some details of a wireless user equipment (UE) and a Node-B base station in a wireless network.

FIG. 2 depicts some details of UE 110 and a Node-B 120. Node-B 120 includes an encoder/decoder 125 which encodes information to be transmitted and decodes received information in the appropriate coding protocol or scheme. Node-B includes receiver/transmitter circuitry 127 for wirelessly receiving identityless packets from the UE 110, and for transmitting packets to the RNC 130 (which may be transmitted via a landline). Node-B 120 also includes a processor 121 which contains circuitry or other logic capable of performing or controlling the processes and activities involved in wireless communications, and in particular, the processes or activities set forth herein. For example, the processor 121 includes logic organized to recognize that an identityless retransmission is associated with a previously received initial transmission based upon the retransmission being received a predetermined number of instances following the initial failed transmission.

The Node-B 120 may also be configured to include a memory 123 for storing the various protocols, routines, processes or software to be used in conducting wireless communications as set forth herein. For example, the memory 123 may store one or more transmission schemes, protocols or strategies for communicating with a UE 110. The transmission schemes, strategies and protocols include information concerning the timing for retransmissions due to lost or corrupted data, the redundancy version encoding (if any), and any encoding schemes or protocols to be used for the transmission and reception of wireless communications. This information may also be stored in the memory of the RNC 130, and communicated to the Node-B 120 as needed or while performing periodic updates and system maintenance. Embodiments of the UE 110, as shown in FIG. 2, typically include a processor or other logic 107, memory 109 and encoder/decoder circuitry 111 which perform functions similar to those of the corresponding parts of Node-B 120. For example, the encoder circuitry 111, or other like circuitry with the UE 110, is configured to encode or otherwise encapsulate data into an identityless packet for transmission to Node-B 120. Each UE 110 also has an antenna 113, receiver/transmitter circuitry 115 and other electronics known to those of ordinary skill in the art for wirelessly receiving and transmitting information.

The wireless system 100 may include information in a Home Location Register (HLR) and a number of Visitor Location Registers (VLRs) for call-routing and roaming. A centralized HLR typically contains the administrative information for each UE 110 registered within the wireless system 100, along with the current location of the UE 110. The VLR stores selected administrative information from the centralized HLR for use in call control and the provisioning of the subscriber services for each UE 110 currently under control of the RNC 130. Each RNC 130 typically has a VLR associated with it, often stored in a memory of the RNC 130. Other registers may be used for authentication and security in wireless network 10, for example, an Equipment Identity Register (EIR) and an Authentication Center (AuC).

The UE 110 includes logic labeled as processor 107 in FIG. 2. In practice the logic may be configured in the form of one or more processing circuits executing resident configured logic, a microprocessor, a digital signal processor (DSP), a microcontroller, or a combination of these or other like hardware, software and/or firmware configured to at least perform the operations described herein, for example, the UE 110 activities described in FIG. 6. The UE 110 may contain a Subscriber Identity Module (SIM) or other such circuitry that identifies the UE 110, enabling it to make and receive calls at that terminal and receive other subscribed services. An International Mobile Equipment Identity (IMEI) of the UE 110 stored on the SIM card uniquely identifies that particular UE 110. The SIM card may also have an International Mobile Subscriber Identity (IMSI) used to identify the subscriber to the system, along with a copy of a secret key from the AuC register for authentication, and other information pertaining to security, identification and communication protocols. A UE 110 often has installed on it, or otherwise downloads, one or more software applications, such as games, news, stock monitors, and the like.

Depending upon the transmission conditions of the channel, bit errors may cause disruptions which need to be addressed to carry on seamless wireless communications. The probability that a frame contains a bit error is a function of bit error rate of the channel and the amount of data in the instance or length of the frame. The wireless system 100 is implemented with one or more mechanisms for detecting and/or recovering from transmissions subject to bit-errors, for example, Automatic Repeat Request (ARQ) and/or Forward Error Correction (FEC). While conventional implementations of EUL require a fair amount of overhead which soaks up valuable bandwidth resources, embodiments of the invention reduce the overhead associated with EUL, thus increasing the overall system performance for handling uplink transmissions.

ARQ uses a feedback channel that allows the receiver to send information back to the transmitter pertaining to the success or failure of the transmission. Typically, ARQ schemes rely on out-of-band feedback channels, although some ARQ schemes may be implemented using in-band feedback. ARQ may be implemented explicitly using a negative acknowledgment (NACK, sometimes represented as NAK) to request a retransmission. Alternatively, ARQ may be implemented implicitly using an acknowledgement (ACK) in conjunction with a timeout rule. Upon receiving a transmission from UE 110, the Node-B 120 may be configured to send an ARQ signal to provide feedback regarding the transmission in the form of either an ACK or a NACK. For example, in a system with explicit out-of-band ARQ feedback, if data from UE 110 is corrupted or lost before being received by Node-B 120, the Node-B sends back a NACK indicating that the UE 110 should retransmit the failed transmission.

The retransmission takes place according to a prearranged transmission scheme which entails sending the retransmission a predetermined number of instances (timeslots) following the instance of the failed initial transmission. Generally, the prearranged transmission scheme has the retransmission scheduled in the next group of instances, in the instance occupying the same relative position (e.g., the third instance in the group, the fourth instance, etc.). NACKs may be repeated for each failed retransmission up to a predetermined number of times—that is, up to the allowed number of repeat tries—or until the instance has been received without errors, in which case a positive acknowledgment (ACK) is sent. Error recovery comes into play in cases where the retransmission(s) themselves contain data errors, but an error-free instance is produced by soft combining two or more of the transmission/retransmissions.

Various embodiments use the Hybrid ARQ (HARQ) protocol to recover from bit errors received in a transmission instance. HARQ systems add the use of FEC in addition to the ARQ acknowledgement feedback techniques. This tends to improve the throughput of the system since the FEC enables the system to detect and correct bit errors in addition to the ARQ feedback needed for retransmissions. FEC schemes use parity bits, or redundant bits for implementing the FEC code. As such, the FEC scheme adds a measure of redundancy to the transmitted data in a manner that allows a receiver to detect and correct errors that occur on a transmission channel. This tends to make the transmitted signal less susceptible to noise without increasing signal power. Accordingly, this reduces the number of retransmissions required, and therefore improves throughput performance, but requires more complex transmitter and receiver designs to implement the FEC. The use of FEC in a HARQ system tends to improve the bit error rate (BER) or data throughput for a given transmission output power. A BER value for a particular ARQ scheme would be determined by tracking the rate of undetected errors—that is, bit errors that occur despite the presence of the ARQ scheme. However, BER is not a robust means of gauging the performance of a particular ARQ scheme since the BER value should approach zero if the ARQ scheme is effective. The use of FEC in a HARQ system tends to reduce the frame error rate (FER), a frame-based error measure similar to BER. Data throughput is another measure often used to gauge the effectiveness of a particular HARQ scheme. Data throughput may be measured in terms of the average number of encoded data bits that a receiver correctly receives during an amount of time it takes the transmitter to transmit one bit. Throughput, measured in bits/channel, may be thought in terms of the HARQ scheme's retransmission overhead. The theoretical throughput limit of an ARQ scheme is the maximum transmission capacity of the channel. HARQ systems have a lower throughput limit than that of ARQ systems.

HARQ techniques have become increasingly sophisticated since it was first proposed, and there are a couple of different types of HARQ which have been implemented. Type-I HARQ systems were an improvement over ARQ in that type-I HARQ adds FEC redundancy to each transmitted frame and then performs a deFEC function in the receiver to estimate the bits of the frame. Cyclical redundancy check (CRC) computation detects the presence of errors within the received data. The FEC encoding/decoding and CRC computation is repeated for each retransmission request. This reduces the theoretical throughput to no more than the rate of the FEC code which is used. Type-I HARQ systems may use the same code for both error detection and error recovery. Type-II HARQ schemes use a form of incremental redundancy which adaptively varies the added number of parity bits in data retransmission incidences. Type-II HARQ systems have the added ability to vary their throughput dynamically as channel conditions change. This adaptability makes such systems particularly useful in applications with fluctuating channel conditions, such as mobile and satellite packet data, where a feedback channel is available and latency due to retransmission delay is acceptable. The initial transmission of a Type-II HARQ packet consists of payload information bits along with CRC bits. If errors are detected requiring a retransmission, incrementally redundant parity bits are added to increase the chances of recovering the dropped data transmission.

The retransmission from UE 110 to Node-B 120 may be soft combined with the initial transmission in an effort to recover from received errors. Since retransmissions are combined with previous transmissions (including previous retransmissions), the encoding scheme used for the initial transmission and retransmission should be rate compatible. Sometimes bit-errors are not detected at Node-B. Such situations may warrant an RLC retransmission error recovery scheme in which a NACK is initiated from upstream of the Node-B 120. However, RLC retransmissions tend to cause significant delay. To avoid RLC retransmission delay, if a packet is received in error after the last retransmission the UE can start the new transmission of the same packet. That is, in some embodiments MAC Layer retransmissions are enabled to avoid RLC retransmissions and hence lower the delays.

Providing incremental redundancy in a retransmission (e.g., in the Type-II HARQ scheme) involves coding the retransmitted data in a different yet compatible manner as the initial transmission. In this way the initial transmission and the retransmission may be soft combined to enhance the chances of error recovery. In EDGE systems, backward compatibility may be achieved by maintaining the same RLC/MAC (Radio Link Control/Medium Access Control) architecture as is used in GSM using blocks belonging to the same "family" for the retransmissions. For example, the information in a transmission coded using one MCS-9 radio block may be combined with a retransmission encoded using two MCS-6 radio blocks, or may be combined with a retransmission encoded using four MCS-3 radio blocks. Data encoded using MCS-9, MCS-6 or MCS-3 may be soft combined since these schemes are from the same family and have a 1-2-4 code rate relationship. Alternatively, transmissions encoded using schemes from different MCS families may be combined, so long as bit stuffing is used to offset the differing block sizes.

In addition to HARQ, EUL may be implemented with some other new uplink functionalities, including for example, Node-B controlled scheduling and shorter transmission timing interval (TTI) length. This may entail the establishment of new MAC functionalities, which can be included in MAC-e, a new MAC entity. MAC-e is intended to cover HARQ and scheduling functionalities, and so the related protocol details as well as issues like transport format combination (TFC) selection, number of enhanced uplink Dedicated Channel (E-DCH) transport channels and location of the reordering entity should be considered.

One aspect of HARQ is that it provides for out-of-sequence data delivery. Since Radio Link Control (RLC) relies upon in-sequence delivery, reordering is performed in the medium access control (MAC) layer, before the data is passed to RLC. The reordering entity may either be located in Node-B 120 or RNC 130 of the wireless system 100 shown in FIG. 1. For downlink communications the HSDPA reordering entity is generally located in Node-B 120 to be in proximity to where the scheduling takes place, since the selection of the number of protocol data units (PDUs) to put in a single packet depends on the scheduled data rate. However, for uplink communications there is no need to locate the reordering entity in Node-B 120 where scheduling takes place. So there is little to be gained in placing the reordering entity in Node-B 120 versus placing it in RNC 130. In fact, since soft handovers from one Node-B 120 to the next are bound to occur it may in fact be desirable to locate the reordering entity for uplink communications in the RNC 130. Locating the reordering entity within RNC 130 would enable selection combining to be performed before reordering, and quite possibly shorten the reordering delay due to waiting for in-sequence data. One additional reason for placing the uplink reordering entity in the RNC 130 is that the buffering requirements may be decreased. Due to buffer multiplexing gains, the reordering done in the RNC 130 tends to alleviate the significant buffering requirements in case the reordering is done in Node-B 120.

As discussed above, locating HARQ in Node-B 120 allows for fast retransmissions of the data received in error. The downlink retransmission scheme employed in HSDPA can similarly be used in the uplink for Enhanced Dedicated Channel (E-DCH) in EUL, with one difference being in the implementation of synchronous HARQ in EUL, as opposed to using asynchronous HARQ in HSDPA. Depending upon the specifics of the implementation, a synchronous HARQ operation for uplink transmissions may provide benefits such as reduced control channel overhead, smaller buffering requirements, reduced delay variability, better load prediction, or simplified reordering and scheduling mechanisms. Hence, if a synchronous HARQ with deterministic redundancy version sequence is supported, the overhead requirements may be reduced by omitting the tag or other packet identification information, for example, omitting the HARQ process ID and the New Data Indicator bit. In some embodiments the redundancy version (RID) may be the only related signalling that is needed.

Figure 3:
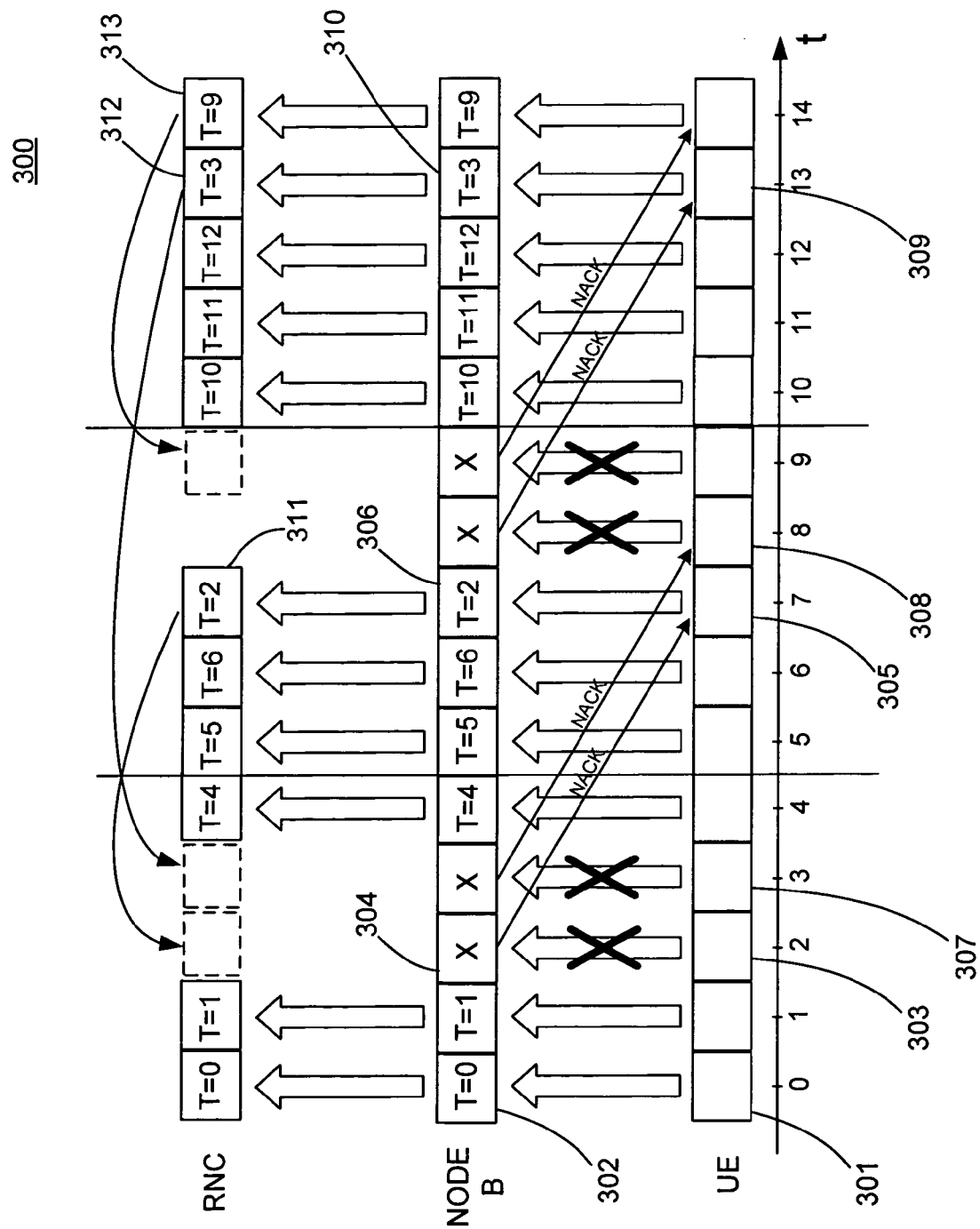
FIG. 3 depicts a representation of uplink signals transmitted from a wireless UE to a Node-B, and then to the RNC, wherein the UE uplink transmissions to Node-B do not contain packet identification information.

FIG. 3 depicts a representation of uplink signals transmitted from wireless UE 110 to Node-B 120, and then to RNC 130, wherein the UE uplink transmissions to Node-B do not contain packet identification information. The term packet identification information, as used herein, is intended to mean the coded transmission sequence number (TSN), or tag, used to identify a particular packet. In conventional systems the in-band control information about Queue ID is used to reorder the buffer containing the payload, and the TSN serves to identify the sequence of the packet. In other words, conventional uplink systems use the in-band Queue ID and TSN in a manner similar to their use in HSDPA downlink transmissions. By contrast, various embodiments of the invention which are implemented with synchronous HARQ may omit the TSN, sending identityless packets and thus reducing overhead. Based on the synchronous HARQ timing, once a packet is successfully received, Node-B 120 may append the tag (e.g., E-DCH frame number). The tag is attached when a packet is correctly decoded and ready to send to the RNC. Hence, by incorporating the tag to each packet sent from Node-B 120 to RNC 130, the reordering may be performed at RNC 130 based on the tag.

The horizontal axis of FIG. 3 represents time, with the incidences (which may be called time slots in some systems) in the figure labeled from t=0 through t=14. The numeric values for time in the figure are arbitrary; t=0 through t=14 could be relabeled t=750 through t=764 without affecting the description herein. In FIG. 3 the lowercase "t" along the horizontal axis represents the actual time of the instance, e.g., the transmission time. In the figure the upper case "T" at Node-B represents Node-B's notion of the E-DCH frame number that should be associated with the packet received in that instance. If the packet received at Node-B is a retransmission (e.g., 306), that retransmitted packet 306 will be associated with Node-B's notion of the time of the initial failed transmission 304. Hence, 306 receives the E-DCH frame number tag T=2 since 306 is a retransmission for the failed 304 which took place at t=2.

Above the time axis are three rows of boxes representing packets at various points in the wireless system: at the UE, then at Node-B, and finally at the RNC. The three rows of boxes are intended to represent packets as they reside at UE 110, Node-B 120 and RNC 130 of FIG. 1, ready to be transmitted to the next element in the wireless system 100. Within each box is written a representation of the overhead packet identification information to be transmitted with each packet during that incidence or transmission. For example, the packet 301 to be transmitted at time t=0 is identityless, and as such, does not contain any packet identification information for the packet's transmission from UE to Node-B. Hence, the box in the figure for packet 301 is empty. Only payload information is sent for the packet 301's transmission from UE to Node-B. Once the packet sent at t=0 is received error free at Node-B, the packet identification information T=0 is appended to the packet at 302 before it is transmitted on to the RNC. The packet identification information T=0 is an indication that Node-B expects that the packet 302 was initially transmitted during the time t=0. Various embodiments may use different formats for the packet identification information appended at Node-B, so long as the format is suitable for indicating a time or an order in the sequence of the packet (or the associated initially transmitted packet if the packet being identified is a retransmission; e.g., 306).

If the Node-B had been expecting a retransmission from a previously failed transmission, then Node-B would append a label from the time of the initial, failed transmission. For example, the packet 302 transmitted at time t=2 was received at Node-B with errors, as indicated by the "X" at 304. Since Node-B received packet 304 containing errors, Node-B transmitted a NACK back to the UE rather than forwarding the failed packet on to the RNC. According to a prearranged transmission scheme, after sending a NACK, Node-B can expect a retransmission for failed packet 304 a predefined number of instances after the initial transmission which failed (five instances in this example). As shown in FIG. 3 five instances after the failed transmission (304), at time t=7, Node-B receives retransmission of the packet (306). Various embodiments of the invention are implemented in a synchronous system, and therefore retransmissions may be prearranged to take place a predetermined number of instances later in the subsequent corresponding instance of the next group of instances. In the example illustrated in FIG. 3, retransmissions take place five instances later. The retransmission for failed packet 303 sent at time t=2 is scheduled to take place at time t=7, labeled as packet 305 in the figure. Packet 303 is in the third instance of the first group of packets in FIG. 3, and packet 305 is in the third instance of the second group of packets. Hence 305 is in the same relative position of instances in the group following 303. Upon determining that the retransmissions resulted in error free reception of the data, Node-B labels the packet (which may be a result of a soft combination of 303 and 305) with packet identification information T=2 at 306 because Node-B was expecting a retransmission at time t=7 for the packet 303 originally sent at time t=2. Node-B, after appending packet identification information T=2 to the packet, transmits the packet to the RNC. Upon being received at the RNC the packet 311 is put back into the correct order, in the position indicated by the dotted line.

If transmission of a packet fails twice, a second retransmission of the packet will be sent two groups of instances following the initial transmission. For example, the initial transmission 307 fails and following a NACK signal the retransmission 308 fails, so the packet 309 will be retransmitted in response to a NACK signal. Since the system is a synchronous system, Node-B had been expecting the retransmission of the packet that failed at time t=3 (packet 307) during the time t=8, five instances following the failed packet—or the fourth instance within the group following the failed packet which also failed within the fourth instance of its group. Since the packet at time t=8 was also corrupted, Node-B sent a NACK signal and then expected a second retransmission of the failed packet during time t=13, another five instances later (in the fourth instance of the next group). When the transmission of packet 309 at time t=13 resulted in correct reception of the data (at 310), Node-B appended the packet identification information T=2 to the packet 310, and then transmitted it to the RNC. Regarding NACK errors, as discussed above NACK errors are handled by RLC. In a situation in which a NACK error occurs and the NACK is incorrectly interpreted as an ACK at the UE, then the RLC will determine the missing packet, and the retransmission will be requested from the RLC.

Upon being received at the RNC, the packets are reordered according to their packet identification information appended at Node-B. By sorting the packets based on their time stamps as determined by a prearranged transmission scheme, the RNC is able to put the received packets into their correct order. For example, the retransmitted packets appended with the packet identification information T=2, T=3 and T=9 (that is, 311, 312 and 313, respectively), are reordered into the proper sequence as indicated by the dotted line. It should be noted that the packets retransmitted following a NACK (e.g., 305, 308, 309) may be encoded in the same manner as the originally transmitted packet they are associated with, or they may be encoded as incremental redundancy versions using a compatible encoding scheme.

Figure 4:
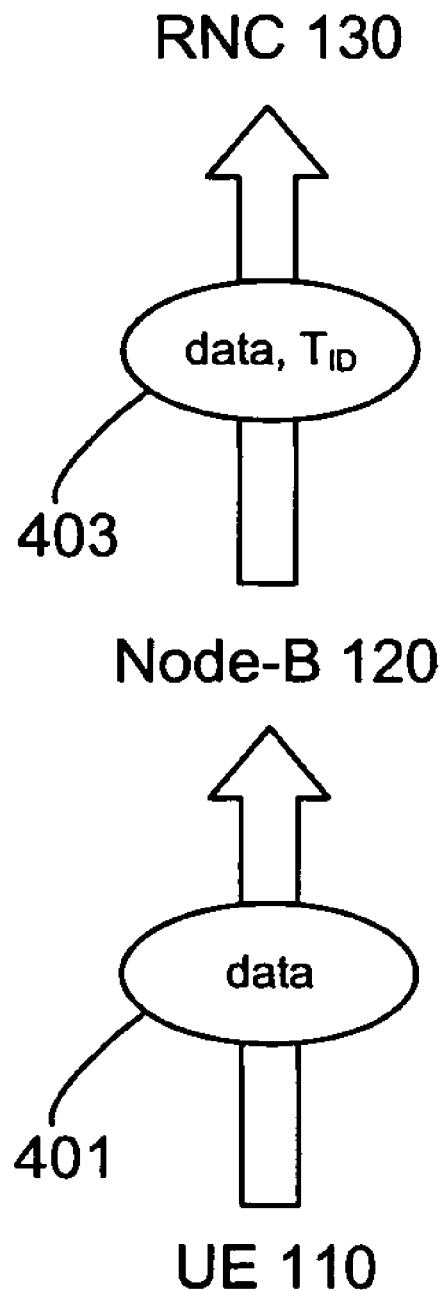
FIG. 4 illustrates the flow of data between elements in a wireless system between the user equipment and the elements of the radio network subsystem.

FIG. 4 is a chart illustrating the flow of data between elements in a wireless system including user equipment UE 110 and the elements of the radio network subsystem, Node-B 120, and RNC 130. UE 110, Node-B 120 and RNC 130 may be arranged as shown in FIG. 1. In various embodiments disclosed herein UE 110 transmits identityless packets of data 401 which do not contain any packet identification information attached to, or embedded within, the packets. Once the data packets have been received error-free by Node-B 120, the Node-B 120 can then transmit the packet 403 to RNC 130 now having packet identification information appended to the packet.

The packet identification information appended to 403 is based upon a prearranged transmission scheme and the instance or time slot in which the data packet 401 is received. Based on the prearranged transmission scheme and whether a packet was received error-free at Node-B a predefined number of instances ago, Node-B 120 knows whether to expect an initial transmission of new data or a retransmission of previously received, corrupted data. Packet 403 shows the appended packet identification information as $T_{ID}$ in FIG. 4. Relating back to the previous figure, FIG. 3, the $T_{ID}$ for packet 306 is T=2, meaning that 306 (received at time t=7) is a retransmission of the data initially transmitted at t=2 (packet 303).

The flow of data and use of appended packet identification information for the various embodiments disclosed herein, as depicted by $T_{ID}$ of FIG. 4, differs from the tags used in conventional systems. In a conventional system the uplink data packet 401 sent from UE to a Node-B would additionally include packet identification information. That is, conventional packets transmitted from UE would have a payload of data and also require an additional amount of overhead dedicated to identifying the packet, for example, including "$pkt_{ID}$" in the packets in addition to data, wherein the "$pkt_{ID}$" represents conventional packet identification information appended to packets transmitted from UE. The $pkt_{ID}$ included in conventional packets may be a packet number or other identifying information such as the HARQ process ID, the Queue ID or the transmission sequence number (TSN). Various embodiments of the invention reduce the overhead on uplink transmissions from UE 110 to Node-B 120 by omitting the packet identification information, and instead send identityless packets without any identification tags or other packet identification information. Then, once an identityless packet has been received at Node-B 120, the control logic of Node-B may append packet identification information to the identityless packet received from the UE 110. The appended packet identification information may take the form of an E-DCH frame number tag.

Figure 5A:
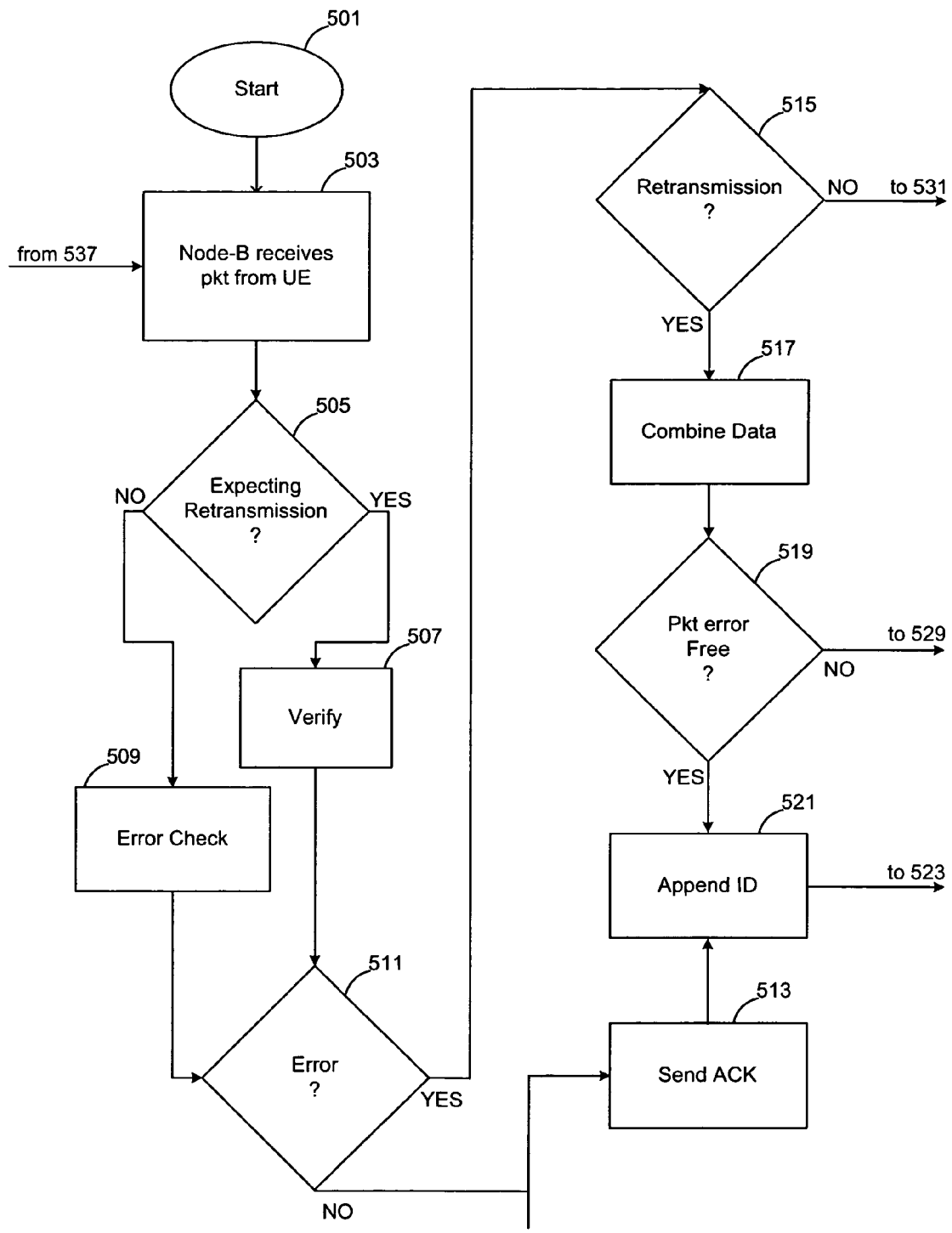
FIGS. 5A and 5B together are a flowchart depicting activities at Node-B for receiving UE signals and retransmitting signals to the RNC.
Figure 5B:
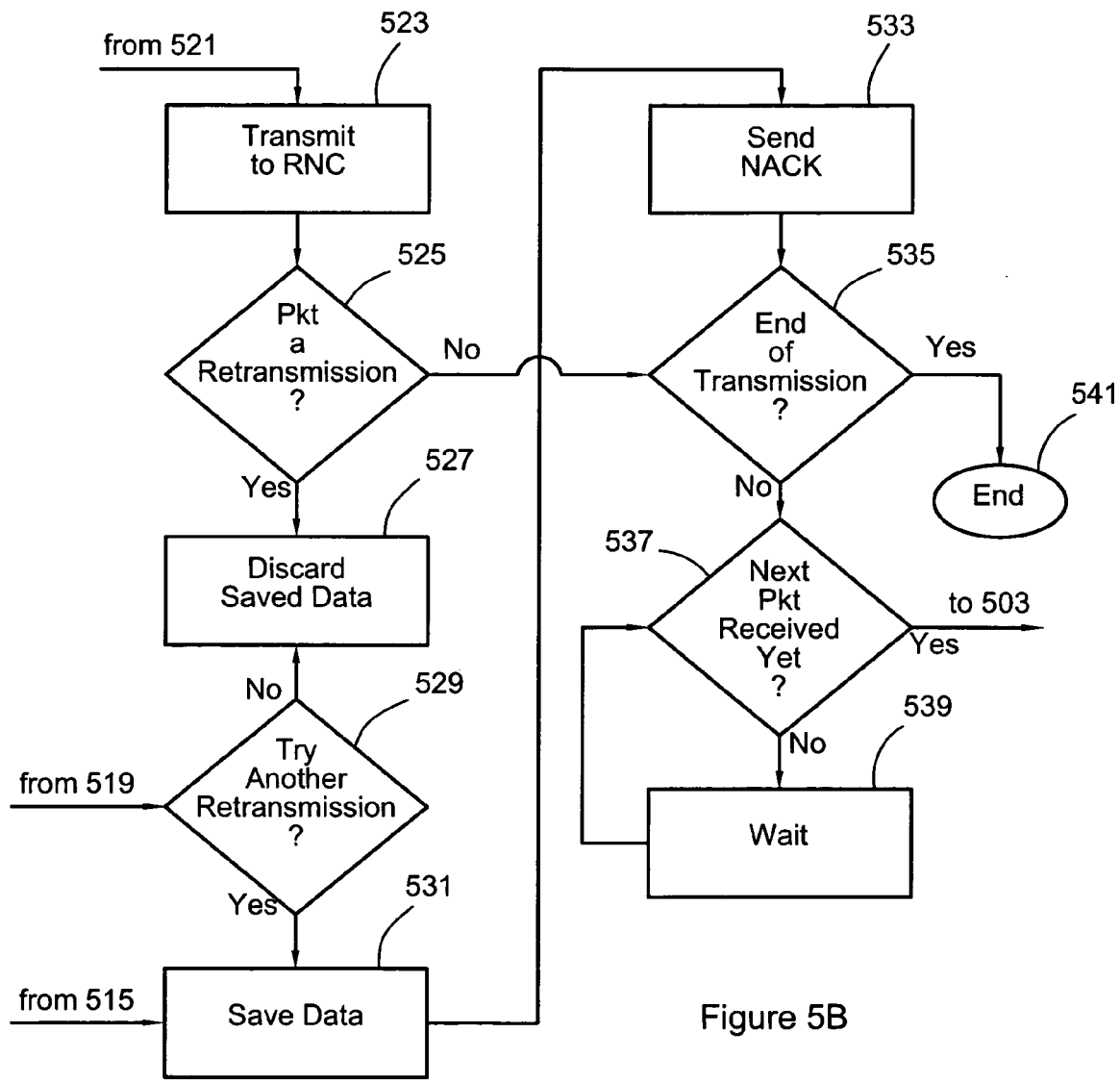

FIGS. 5A and 5B together are a flowchart depicting activities at Node-B for receiving UE signals and retransmitting signals to the RNC in accordance with various embodiments of the invention. The UE, Node-B and RNC may be UE 110, Node-B 120 and RNC 130 shown in FIG. 1. The method begins at 501 and proceeds to 503 where Node-B receives an identityless packet from UE. As used herein, an "identityless" packet is a packet which does not have appended to it an identification tag or other packet identification information such as a packet number, E-DCH frame number, HARQ process ID, Queue ID, TSN, or other like types of data intended to be used in identifying a packet. Once the identityless packet has been received at Node-B the method proceeds to 505 where, based on activities that transpired previously and in accordance with a prearranged transmission scheme, Node-B determines whether it is expecting a retransmission of previously corrupted data or an initial transmission of a new data packet.

By using the prearranged transmission scheme Node-B is able to determine whether the identityless packet received is a retransmission or an initial transmission of a new data packet. If a NACK had been sent in response to a previously received corrupted packet of a predefined number of HARQ instances ago, and then Node-B would expect a retransmission to occur a predetermined number of HARQ instances following the corrupted packet. In a synchronous wireless system 100 the prearranged transmission scheme may be implemented to sent the retransmission in the corresponding instance (e.g., time slot) of the next group of instances. For example, as shown in FIG. 3 Node-B received corrupted packet 304 in the HARQ instance at time t=2. Therefore, abiding by the prearranged transmission scheme Node-B expects a retransmission of the data in the failed 304 packet a predefined number of instances later (five instances later). Five instances later at time t=7 Node-B receives packet labeled in the figure as 306. Since Node-B had been expecting a retransmission of the previously failed packet, Node-B appends packet identification information T=2 to packet 306, indicating that the 306 packet is a retransmission of the 303 packet initially sent at time t=2. According to prearranged transmission schemes of various embodiments of the invention, Node-B can expect a retransmission of corrupted data packet either a predefined number of HARQ instances later or, in a synchronous system, within the corresponding instance of the next group of instances. If there are five instances per group as shown in the example of FIG. 3, then Node-B would expect a retransmission five instances following the receipt of a failed packet.

If a retransmission is expected, the method proceeds in accordance with the "YES" branch from 505 to 507 where it is verified that the received packet is a retransmission of a previously sent packet which contained errors or was otherwise corrupted, that is, the data was not correctly received and decoded at Node-B for some reason. The verification in Node-B of a retransmitted packet may be performed by an error checking procedure or by comparing the data received in the packet thought to be a retransmission with the data of the previously corrupted packet. If a retransmission is expected, Node-B can assume that the newly received packet has the same content as the previously failed one in the previous corresponding incidence (although the content may be encoded in a different manner if it is an incremental redundancy version). Some embodiments may be configured to use the timing of the packet for the purpose of reordering packets, and then provide an indication of new data such as New Data Indicator to prevent ambiguities as to whether it as a new initial transmission of a packet or retransmission.

If, in 505 a retransmission is not expected in the instance in which the data is received the method proceeds in accordance with the "NO" branch from 505 to 509 where error checking is performed on the packet thought to be a new initial transmission from UE. The error check typically involves a cyclical redundancy check (CRC) of the data in the packet, but may be performed using another redundancy check such as a checksum or a frame check sequence (FCS), or by using error correction codes (ECC) such as Hamming codes, Reed-Solomon code, Reed-Muller code, Binary Golay code, convolutional code, turbo code, or other like type of error detection or detection/correction schemes known to those of ordinary skill in the art. In some embodiments the verification of 507 may be performed the same manner, or in conjunction with, the error checking performed in 509.

Once the error checking and/or verification have been completed in 507 and 509 the method proceeds to 511 where it is determined whether an error exists in the packet. If no error was found the method proceeds in accordance with the "NO" branch to 513 where an ACK signal is transmitted back to the UE to acknowledge receipt of the packet. In some embodiments no ACK is sent back to the UE and the 513 block is omitted. The method proceeds from 513 (or directly from 511 if no ACK is sent) to 521 where packet identification information is appended, embedded or otherwise associated with the identityless packet received from the UE. The packet identification information may be in the form of the E-DCH frame number. In alternative embodiments, the packet identification information may take any of several forms such as a packet number, HARQ process ID, Queue ID, the transmission sequence number (TSN), or may represent Node-B's notion of the original transmission time that should be associated with the packet received in that instance, or other like type of data suitable for identifying a packet.

If, in block 511 it was determined that an error does exist in the packet the method proceeds in accordance with the "YES" branch to 515. In 515 if the packet was a retransmission the method proceeds to 517 where the received retransmission packet is combined with the corresponding initial transmission which was previously received and any intervening retransmissions. The data may be combined using any number of techniques including selection combining, soft combining, elective soft combining or some combination thereof. It may be the case that little or no data from the previously received initial transmission is suitable for combining with the retransmitted packet. In such instances any data suitable to be combined will be combined—that is, data will generally be combined if it increases the chances of decoding the packet without errors. Once data from the retransmitted packet is combined in 517, the method proceeds to 519 where it is determined whether the data can be decoded without error. If the combined data is found in 519 to contain errors or otherwise still be corrupted the method proceeds in accordance with the "NO" branch to 529. However, if the combined data is found to be error free in 519 the method proceeds in accordance with the "YES" branch to 521.

In block 521 once a tag or packet identification information has been added to the packet in 521 the method proceeds to 523 where Node-B transmits the packet with identifying overhead data to the RNC. The tag or packet identification information represents the E-DCH frame number of the first subpacket associated with a transmission. At this point the activities for handling that packet have been completed except for some activities which may be thought of as housekeeping keeping activities. The method proceeds from 523 to 525, and if the packet was a retransmitted packet the method proceeds from 525 in accordance with the "YES" branch to 527. In 527 the data associated with the retransmitted packet which had been saved is now discarded. The discarded data may include the initial transmission from a previous corresponding incidence and subsequent retransmissions, if any. In some embodiments the data may not be expressly discarded, and instead simply be written over by new data (see block 531), in which case the activity of block 527 may not need to be performed. If, back in block 525, the transmitted packet was not a retransmitted, the method would proceed according to the "NO" branch from 525 to 535.

Back in block 515, if the packet is an initial transmission rather than a retransmitted packet the method proceeds in accordance with the "NO" branch to 531 where the data is saved within Node-B for future use in combining with a subsequent retransmission. Once the data has been saved in 531 the method proceeds to block 533 and a NACK is sent back to the UE from Node-B. In response to the NACK the UE will send a retransmission of the corrupted data packet in the corresponding instance within the next group of instances (a predetermined number of instances later). Upon sending the NACK the method proceeds from 533 to 535 where it is determined whether the communication has ended, that is, whether the telephone call, wireless uploading of data or other wireless communication from the UE has ended.

Back in block 519 if the combined data was found in 519 to contain errors or otherwise to be corrupted the method proceeded in accordance with the "NO" branch to 529. In block 529 it is determined whether or not another retransmission is to be attempted. Typically, the system will be configured to send no more than a predetermined number of retransmissions before a packet is discarded. Once the maximum number of retransmissions has been tried the data associated with the packet (e.g., the initial transmission and all subsequent retransmissions) will be discarded if the packet still has not been decoded without errors, and no more retransmissions will be attempted for that packet. A counter or other logic within Node-B may be used to keep track of the number of retransmissions and whether the maximum has been reached. In block 529 if it is determined that the predetermined maximum number of retransmissions has been reached and no more retransmissions are to be attempted, the method proceeds in accordance with the "NO" branch to block 527 to discard the saved data, and then the method proceeds to block 535. On the other hand, if, in block 529, it is determined that another retransmission is to be attempted the method proceeds from 529 in accordance with the "YES" branch to 531 to save data from the current packet for use in soft combining with future retransmissions. Once the NACK has been sent in accordance with block 533 the method proceeds to 535.

In 535 it is determined whether or not the communication has ended. If the wireless link is still in place and there are more packets to transmit the communication has not ended, and the method proceeds in accordance with the "NO" branch to 537. In 537 it is determined whether the next packet has been received in the next instance. If the next packet has been received the method proceeds in accordance with the "YES" branch from 537 to block 503 again. If, in block 537, the next packet has not yet been received the method proceeds to 539 to wait for the next transmission. From 539 the method loops back to 537 to where it is again determined whether the next packet has been received. Back at 535, if it is determined that the transmission has ended the method proceeds in accordance with the "YES" branch to 541. For example, if a party on a telephone call hangs up, or a wirelessly connected computer disconnects, or the link is otherwise torn down, then the transmission may considered to have ended and the method proceeds from 535 in accordance with the "NO" branch to 541 where the method ends.

Figure 6:
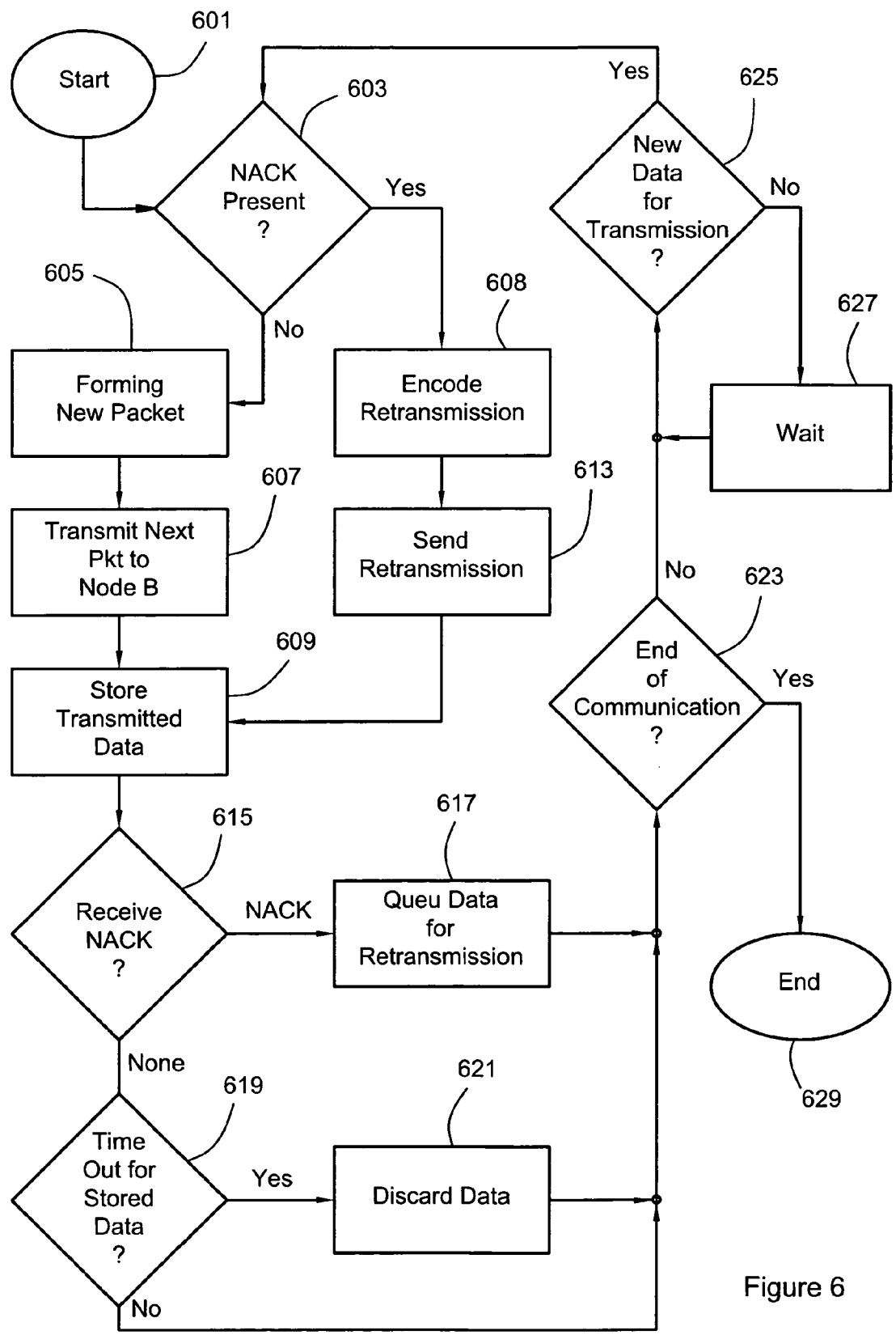
FIG. 6 is flowchart depicting activities in transmitting signals from the UE to a Node-B and retransmitting data from the UE which was lost or corrupted.

FIG. 6 depicts activities in UE to transmit data packets to Node-B, in accordance with various embodiments of the invention. The method starts at 601 upon obtaining information at the UE to transmit to Node-B. The information may include encoded voice information to be transmitted wirelessly in a cellular telephone call. Or the data may include uplinks from the UE for one of the many available wireless multimedia services, e.g., wireless Internet access, video streaming, image transmission, wireless e-mail, interactive gaming or the like. Once data has been obtained for transmission from the UE to a Node-B the method proceeds from block 601 to 603 where it is determined whether a NACK is present, having been received back from Node-B indicating that a packet was received with errors and should be retransmitted. If no NACK is present and there is not a need to retransmit a packet the method proceeds from 603 in accordance with the "NO" branch to 605 for the initial transmission of a data packet. In 605 the data ready for an initial transmission to Node-B is formed into a packet. Packets uplinked in accordance with various embodiments of the invention from the UE to Node-B do not contain packet identification information, that is, they are identityless. As such, the uplink packets from the UE do not include an E-DCH frame number, a HARQ process ID, Queue ID, transmission sequence number (TSN), or other such overhead data included in conventional systems for identifying the packet. Packetizing the data in block 605 may entail retrieving and encoding the data in line to be transmitted next, and any such other activities known to those of ordinary skill in the art. Once the data has been packetized in 605 the method proceeds to block 607. In 607 the next available packet in the communication is transmitted to Node-B. Once the packet has been transmitted the method proceeds to 609 where data of the transmitted packet is stored at the UE for future use in the event the packet has to be retransmitted.

If, back in block 603, there is a NACK present then a retransmission will take place instead of an initial transmission and the method proceeds in accordance with the "YES" branch to 611 encode the saved packet associate with the NACK for retransmission. To increase the chances of error recovery at Node-B the retransmission may be sent as a redundant version of the packet encoded in a manner compatible to the initial transmission. This allows the retransmission to be soft combined with the initial transmission. For example, in EDGE systems a retransmission of GSM blocks from the same "family" as the initial transmission may be soft combined with the first packet. For example, retransmission packets encoded using MCS-9 are compatible with MCS-6 and MCS-3 transmissions. Once the retransmission has been encoded in 611 the method proceeds to 613 where the retransmission is sent, and then to 609 for storage of the retransmitted data. In some embodiments the initial packet may continue to be saved with no need to save the retransmitted packet. In such embodiments the block 609 is omitted following 617, and the method proceeds directly to 615.

In block 615 it is determined whether a NACK has been received or not for packets previously transmitted. If a NACK has been received, the method proceeds from 615 in accordance with the "NACK" branch to 617 where data from the packet associated with the NACK is queued for retransmission. If, in block 615, there is no NACK present the method proceeds along the "NONE" branch to 619. Embodiments of the invention may be implemented in accordance with either an explicit or an implicit ARQ structure. FIG. 6 depicts explicit ARQ in which NACKs are sent back from Node-B to request uplink retransmissions from the UE. Although not shown in the figure ACKs may be sent back to acknowledge error-free receipt of packets, in addition to or in lieu of the NACKs. Embodiments implemented using implicit ARQ rely upon ACKs to acknowledge error-free receipt at Node-B in conjunction with a timeout rule to indicate a retransmission is needed if no ACK is received for a packet within a predetermined amount of time.

In block 619 if a NACK has not been received within a predetermined amount of time since the transmission of a given packet then it is assumed no retransmission will be needed and the method proceeds from 619 to 621 where the saved data from the previously transmitted given packet is discarded. In embodiments using ACKs, the receipt of an ACK at the UE for the given packet will also result in the saved data being discarded. In some embodiments the saved data may not be expressly discarded or erased, and instead may be written over with new data. Upon discarding the saved data in 621 the method proceeds to block 623. Likewise, back in block 619 if the predetermined time (or a predetermined number of instances) has not yet passed since the transmission of the given packet, then the packet is not to be discarded and the method proceeds in accordance with the "NO" branch to 623.

In block 623 it is determined whether the end of the communication has been reached yet or not. If it is determined that the communication has ended then the method proceeds along the "YES" branch to 629 and the process ends. If, in 623, it is determined that the communication has not yet ended the method proceeds along the "NO" branch to 625. In block 625 it is determined whether data is available at the UE to be transmitted on the uplink. If data is available the method proceeds along the "YES" branch looping back around to block 603 to undergo the process of transmitting the data from the UE to Node-B. If, in 625, there is no data available for retransmission the method proceeds along the "NO" branch to 627. Some situations may warrant a default rule to avoid hang-ups in waiting for data. For example, in case of a NACK error on the last subpacket in which a NACK is mistakenly perceived as an ACK or if the UE is not able to support the same data rate as was used for the failed packet. In block 627 the UE waits for data to be transmitted, and then loops back around to block 625 again to check to see if data has been obtained. Back in 623, if it is determined that the communication has ended then the method proceeds along the "YES" branch to 629 and the process ends.

The figures are provided to explain and enable the invention and to illustrate the principles of the invention. Some of the activities for practicing the invention shown in the method block diagrams of the figures may be performed in an order other than that shown in the figures. For example, in FIG. 5A the ACK may be sent (513) after appending the packet identification information (521). This is but one example; other activities depicted in the figures may take place in an order other than that shown. Further, those of ordinary skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those ordinary skilled in the art will also appreciate that the various illustrative logical blocks, modules, circuits, and algorithm routines described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Practitioners of ordinary skill in the art will know to implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, computer or state machine. A processor may also be implemented as a combination of computing devices, e.g., a combination of a DSP and a microprocessor, a plurality of microprocessors, one or more microprocessors in conjunction with a DSP core, or any other such configuration.

The activities of methods, routines or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor in such a manner that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the illustrated and discussed embodiments will be readily apparent to those of ordinary skill in the art, and the principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In describing various embodiments of the invention, specific terminology has been used for the purpose of illustration and the sake of clarity. However, the invention is not intended to be limited to the specific terminology so selected. It is intended that each specific term includes equivalents known to those of skill in the art as well as all technical equivalents which operate in a similar manner to accomplish a similar purpose. Hence, the description is not intended to limit the invention. The invention is intended to be protected broadly within the scope of the appended claims.

The invention claimed is:

1. A method in a wireless communication system, comprising:
   forming data into a plurality of identityless packets for transmission; and
   transmitting the plurality of identityless packets, wherein the plurality of identityless packets are transmitted in accordance with a prearranged transmission scheme allowing a sequence ordering of an out of sequence one of the plurality of identityless packets in relation to others of the plurality of identityless packets to be identified at a receiver prior to receipt of the out of sequence one of the plurality of identityless packets at the receiver, wherein the but of sequence one is identified based solely upon an expected receipt a predefined number of instances after previously expecting the out of sequence one.

2. The method of claim 1, further comprising:
   receiving a NACK indicating that the transmission of one of the plurality of identityless packets failed.

3. The method of claim 2, further comprising:
   sending an identityless retransmission of the data if an initial transmission of the data fails;
   wherein in accordance with the prearranged transmission scheme the retransmission is sent a predefined number of instances following the initial transmission.

4. The method of claim 3, wherein the wireless communication system is a synchronous system.

5. The method of claim 3,
   wherein the instance during which the initial transmission was transmitted is one of a plurality of instances, the plurality of instances being arranged in groups, each of the groups including the predefined number of the instances; and
   wherein a relative position of the initial transmission within a first group of instances corresponds to a relative position of the retransmission within a second group of instances.

6. The method of claim 2,
   wherein the wireless communication system conforms to WCDMA protocols and comprises a Node-B;
   wherein user equipment transmits the plurality of identityless packets of the data to the Node-B; and
   wherein the Node-B transmits the NACK.

7. A wireless communication system comprising:
   an encoder configured to encode data into a plurality of identityless packets;
   transmission circuitry configured to send an initial transmission of one of the plurality of identityless packets;
   receiver circuitry configured to receive signals comprising a NACK associated with the initial transmission; and
   a processor including logic organized to control sending a retransmission of another instance of the data in response to receiving the NACK;
   wherein the initial transmission and retransmission are sent in accordance with a prearranged transmission scheme allowing a sequence ordering of an out of sequence one of the plurality of identityless packets in relation to others of the plurality of identityless packets to be identified at a receiver prior to receipt of the out of sequence one of the plurality of identityless packets at the receiver, wherein the out of sequence one is identified based solely upon an expected receipt a predefined number of instances after previously expecting the out of sequence one.

8. The wireless communication system of claim 7, wherein according to the prearranged transmission scheme the retransmission is sent a predetermined number of instances following the initial transmission.

9. The wireless communication system of claim 7,
   wherein the wireless communication system conforms to WCDMA protocols and comprises a Node-B which transmits the NACK; and
   wherein the wireless communication system comprises wireless equipment which comprises the transmission circuitry which sends the initial transmission of the plurality of identityless packets.

10. The wireless communication system of claim 7, wherein the wireless communication system is a synchronous system.

11. A method of operating in a wireless communication system, the method comprising:
    receiving a plurality of identityless data packets wirelessly transmitted via the wireless communication system;
    identifying an initial transmission based upon an instance during which the initial transmission was received in view of a prearranged transmission scheme, wherein the transmission scheme allows a sequence ordering of an out of sequence one of the plurality of identityless packets in relation to others of the plurality of identityless packets to be identified at a receiver prior to receipt of the out of sequence one of the plurality of identityless packets at the receiver, wherein the out of sequence one is identified based solely upon an expected receipt a predefined number of instances after previously expecting the out of sequence one; and
    appending packet identification information to each of the plurality of data packets.

12. The method of claim 11,
    wherein the packet identification information is appended at a base station and represents an E-DCH frame number of the initial transmission; and
    wherein the wireless communication system is a synchronous system.

13. The method of claim 12, further comprising:
    sending each of the plurality of data, packets to which is appended the packet identification information upstream to a radio network controller.

14. The method of claim 11, further comprising:
    sending a NACK upon determining that an initial transmission of one of the plurality of data packets is corrupted;
    receiving, in response to the NACK, an identityless retransmission of the one of the plurality of data packets transmitted in the initial transmission; and
    associating the retransmission with the initial transmission based upon an instance during which the retransmission was received in view of the prearranged transmission scheme.

15. The method of claim 14,
    wherein the instance is one of a plurality of instances arranged in groups, each of the groups including a predefined number of the instances; and
    wherein a relative position of the initial transmission within a first group of instances corresponds to the relative position of the retransmission within a second group of instances.

16. The method of claim 11,
    wherein the identityless initial transmission of the data packet is received at a base station; and
    wherein the wireless communication system conforms to WCDMA protocols.

17. A wireless communication system comprising:
    receiver circuitry configured to wirelessly receive a plurality of identityless data packets;

a decoder configured to decode an initial transmission received by the receiver circuitry;

transmission circuitry configured to send signals comprising a NACK associated with the initial transmission upon the initial transmission being corrupted; and a processor including logic, organized to recognize a retransmission as being associated with the initial transmission based upon the retransmission being received a predetermined number of instances following the initial transmission, the logic further organized to allow a sequence ordering of an out of sequence one of the plurality of identityless packets in relation to others of the plurality of identityless packets to be identified at a receiver prior to receipt of the out of sequence one of the plurality of identityless packets at the receiver, wherein the out of sequence one is identified based solely upon an expected receipt a predefined number of instances after previously expecting the out of sequence one.

18. The wireless communication system of claim 17, wherein the wireless communication system conforms to WCDMA protocols and comprises a base station which includes the receiver circuitry that is configured to receive the identityless initial transmission packet.

19. The wireless communication system of claim 18, wherein the base station is a Node-B configured to append packet identification information to the initial transmission representing an E-DCH frame number of the initial transmission upon the initial transmission being error free; and wherein the wireless communication system is a synchronous system.

20. A mobile station configured to operate in a wireless communication system, the mobile station, comprising:

means for encoding data into a plurality of identityless packets;

means for transmitting an initial transmission of one of the plurality of identityless packets;

means for receiving signals comprising a NACK associated with the initial transmission; and processor means for controlling a retransmission of the data in response to receiving the NACK;

wherein the retransmission is sent in accordance with a prearranged transmission scheme allowing a sequence ordering of an out of sequence one of the plurality of identityless packets in relation to others of the plurality of identityless packets to be identified at a receiver prior to receipt of the out of sequence one of the plurality of identityless packets at the receiver, wherein the out of sequence one is identified based solely upon an expected receipt a predefined number of instances after previously expecting the out of sequence one.

21. A non-transitory processor-readable medium include processor-executable instructions thereon for performing a method of operating in a wireless communication system, the method comprising:

receiving a plurality of identityless data packets wirelessly transmitted via the wireless communication system;

identifying an initial transmission based upon an instance during which the initial transmission was received in view of a prearranged transmission scheme, wherein the transmission scheme allows a sequence ordering of an out of sequence one of the plurality of identityless packets in relation to others of the plurality of identityless packets to be identified at a receiver prior to receipt of the out of sequence one of the plurality of identityless packets at the receiver, wherein the out of sequence one is identified based solely upon an expected receipt a predefined number of instances after previously expecting the out of sequence one; and appending packet identification information to each of the plurality of data packets.

\* \* \* \* \*